United States Patent
Benoit et al.

(10) Patent No.: US 11,828,725 B2
(45) Date of Patent: Nov. 28, 2023

(54) SURFACTANT SELECTION WORKFLOW BASED ON PERFORMANCE AT THE RESERVOIR SURFACE

(71) Applicant: HALLIBURTON ENERGY SERVICES, INC., Houston, TX (US)

(72) Inventors: Denise Nicole Benoit, Houston, TX (US); I Wayan Rakananda Saputra, College Station, TX (US); Antonio Recio, III, Humble, TX (US); Kristina Henkel Holan, Cypress, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 533 days.

(21) Appl. No.: 16/719,300

(22) Filed: Dec. 18, 2019

(65) Prior Publication Data
US 2021/0190727 A1 Jun. 24, 2021

(51) Int. Cl.
*G01N 29/02* (2006.01)
*G01N 29/036* (2006.01)

(52) U.S. Cl.
CPC ......... *G01N 29/022* (2013.01); *G01N 29/036* (2013.01)

(58) Field of Classification Search
None
See application file for complete search history.

(56) References Cited

U.S. PATENT DOCUMENTS

| | | | |
|---|---|---|---|
| 3,235,007 A * | 2/1966 | Kieschnick, Jr. | E21B 43/267 166/280.1 |
| 6,130,199 A | 10/2000 | Chan et al. | |
| 10,023,787 B2 | 7/2018 | Benoit et al. | |
| 2006/0278390 A1 * | 12/2006 | Reddy | C09K 8/887 507/903 |
| 2013/0075337 A1 | 3/2013 | Lochhead et al. | |
| 2016/0047788 A1 | 2/2016 | Gaughan et al. | |
| 2017/0284605 A1 | 10/2017 | Janak et al. | |
| 2018/0156708 A1 | 6/2018 | Drake et al. | |
| 2018/0328172 A1 | 11/2018 | Pelletier et al. | |
| 2019/0317005 A1 * | 10/2019 | Acosta | G01N 15/0806 |

OTHER PUBLICATIONS

Anderson, William G. "Wettability literature survey part 5: the effects of wettability on relative permeability." Journal of petroleum technology 39, No. 11 (1987): 1453-1468. (Year: 1987).*
Liu et al., Understanding the Cation-Dependent Surfactant Adsorption on Clay Minerals in Oil Recovery, Energy & Fuels, 2019, vol. 33, pp. 12319-12329.
PCT International Search Report & Written Opinion mailed in corresponding PCT Application No. PCT/US2020/014760 dated Sep. 15, 2020, pp. 1-11.

* cited by examiner

*Primary Examiner* — Elizabeth A Robinson
*Assistant Examiner* — Ryan J Dowty
(74) *Attorney, Agent, or Firm* — McAfee & Taft

(57) ABSTRACT

Systems and methods wherein well-treatment fluids are evaluated for use in a subterranean reservoir. The systems and methods utilize quartz crystals configured to be quartz crystal microbalances (QCM). The QCM has a surface with a reservoir-specific material deposited on the surface. The reservoir-specific material is representative of formation material or proppant. Changes in mass of the reservoir-specific material are measured using the QCM. The changes reflect the interaction of the treatment fluid with the reservoir-specific material and/or hydrocarbons in the reservoir-specific material.

20 Claims, 14 Drawing Sheets

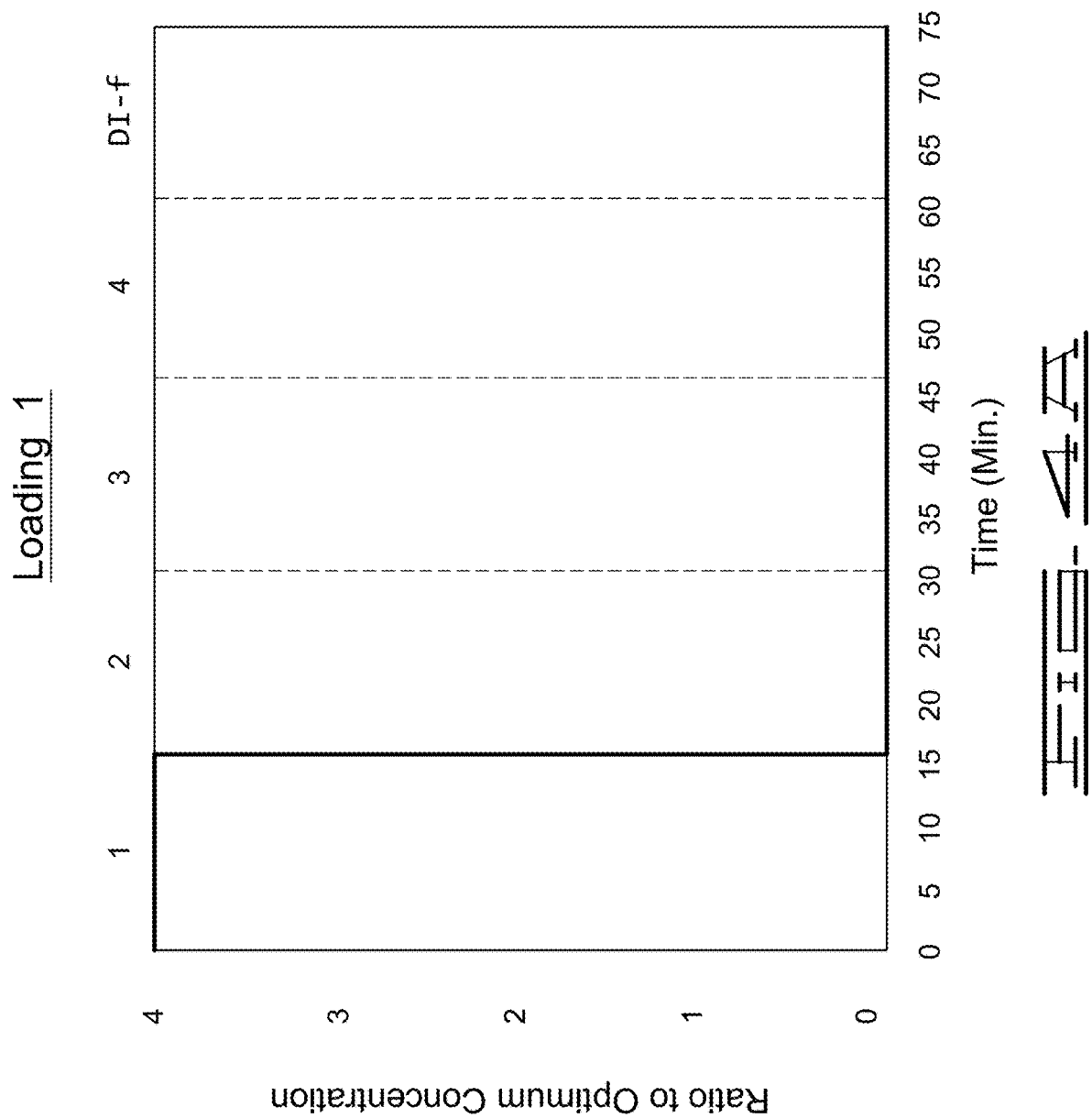

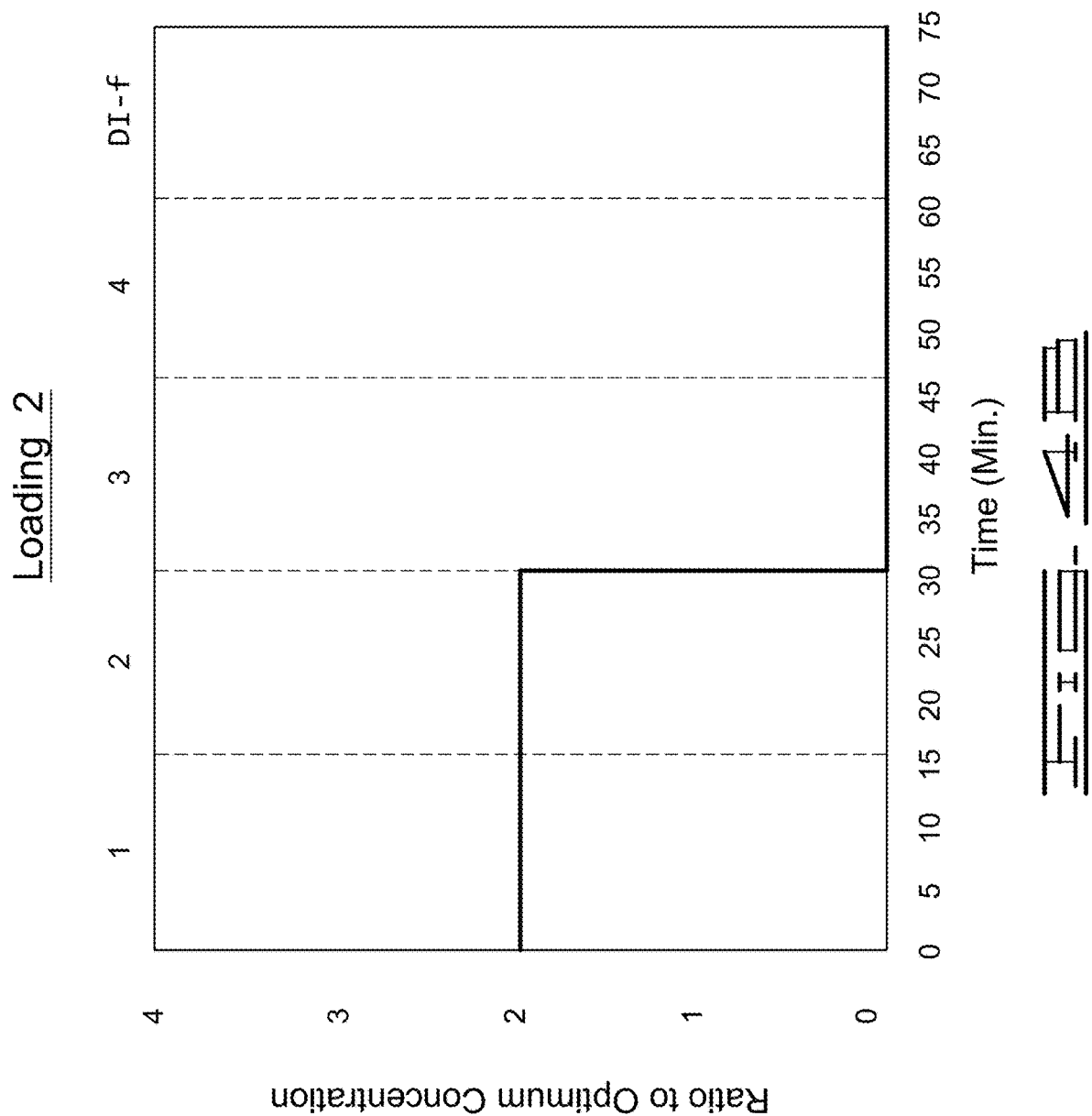

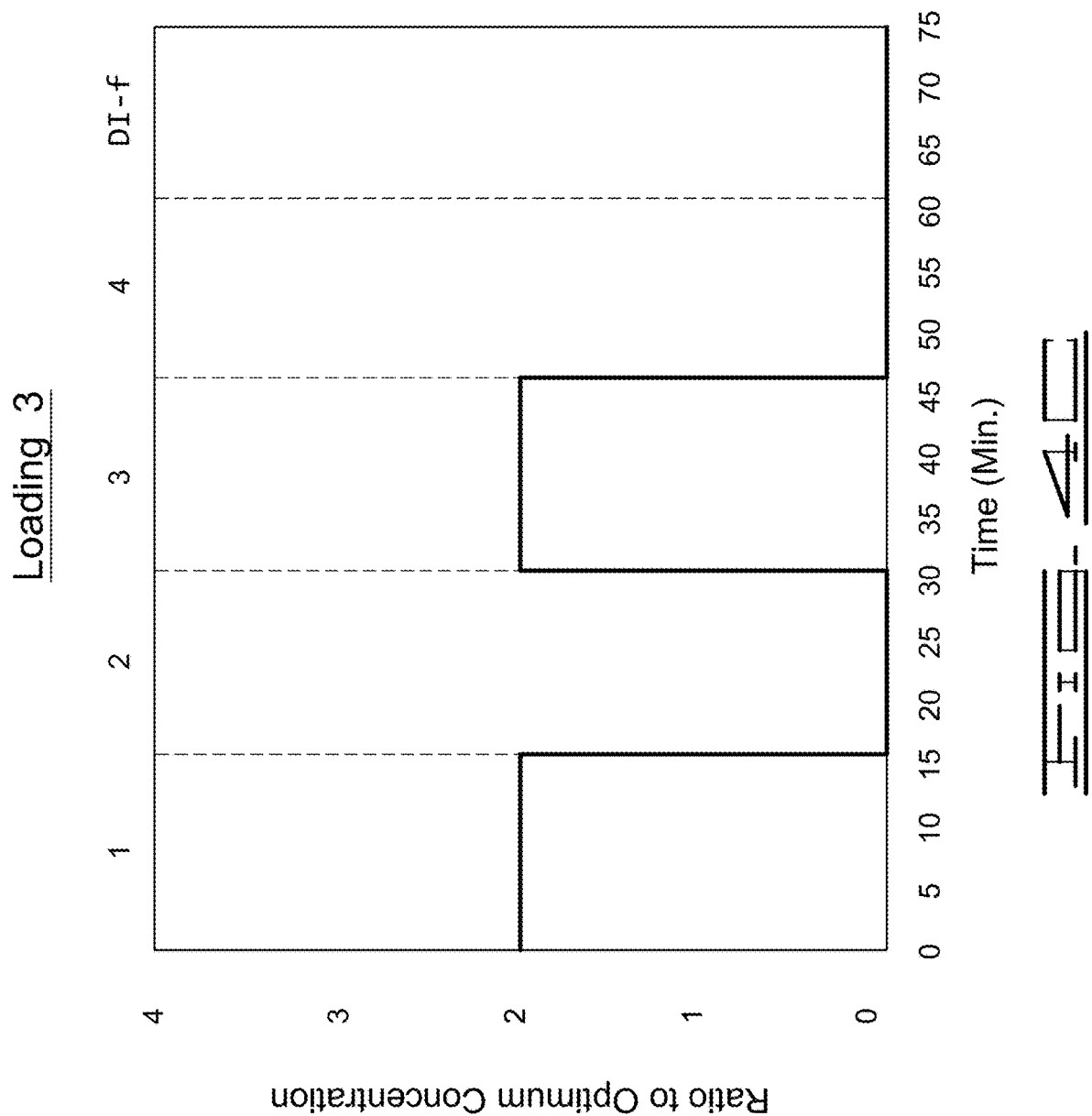

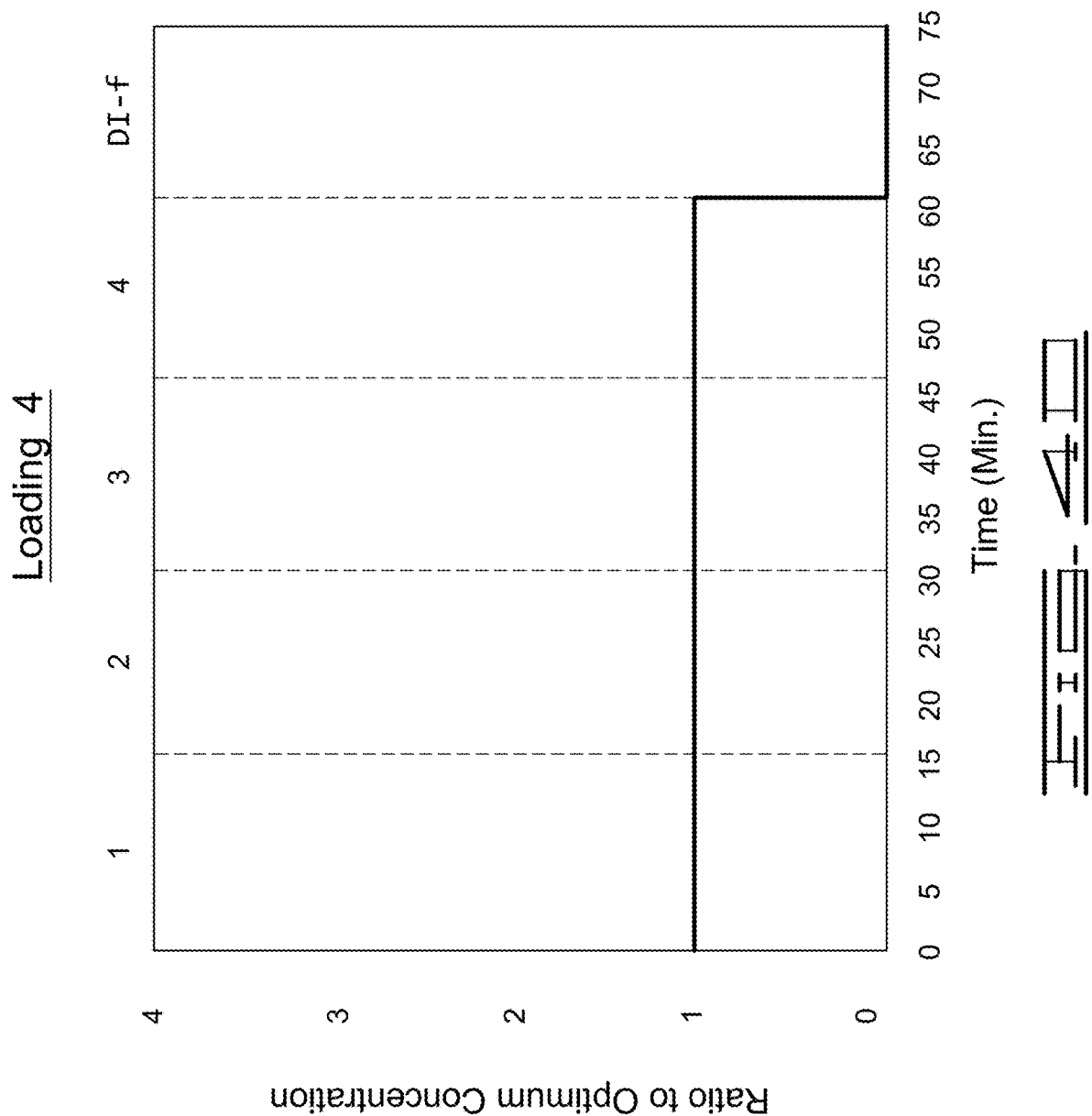

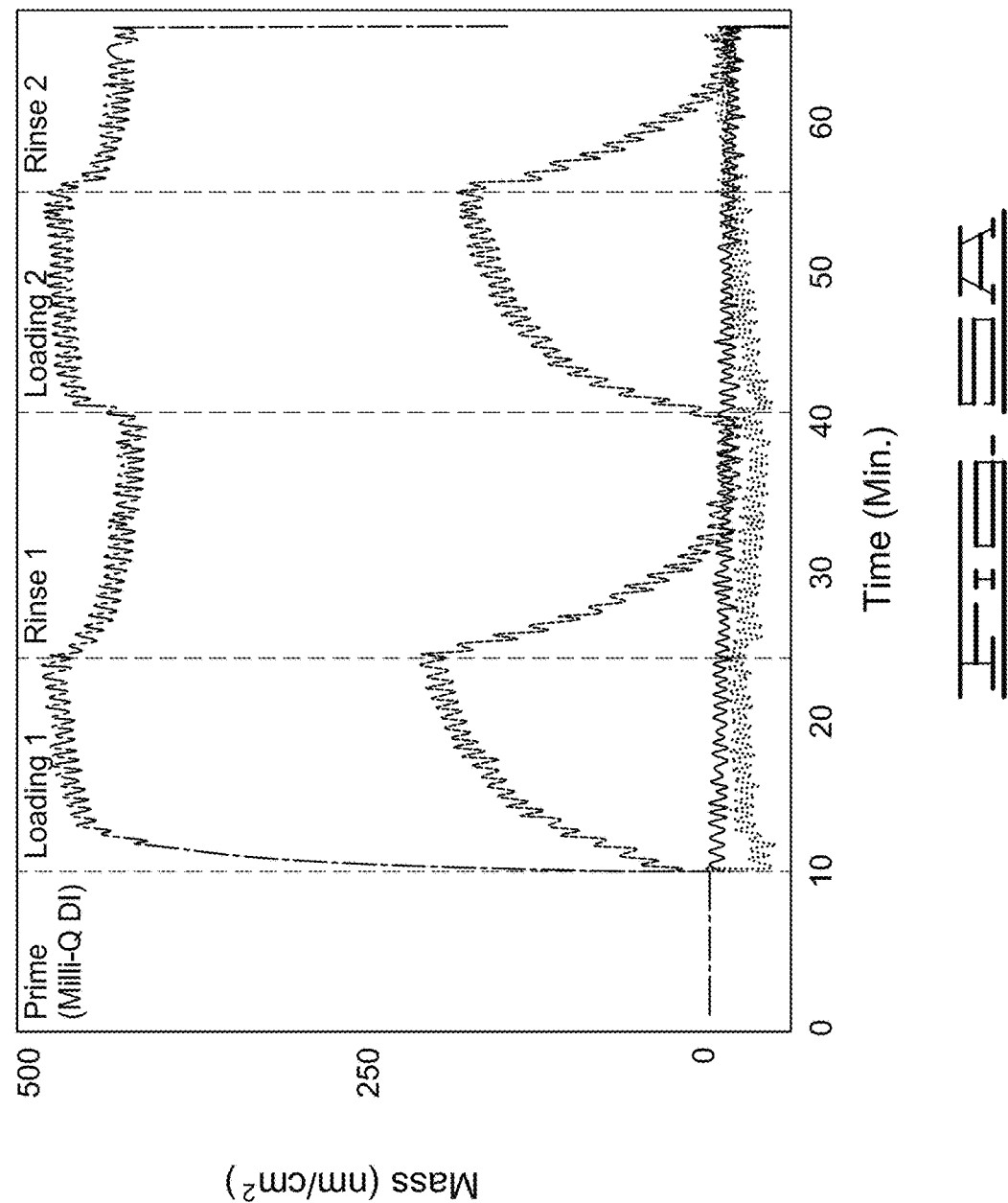

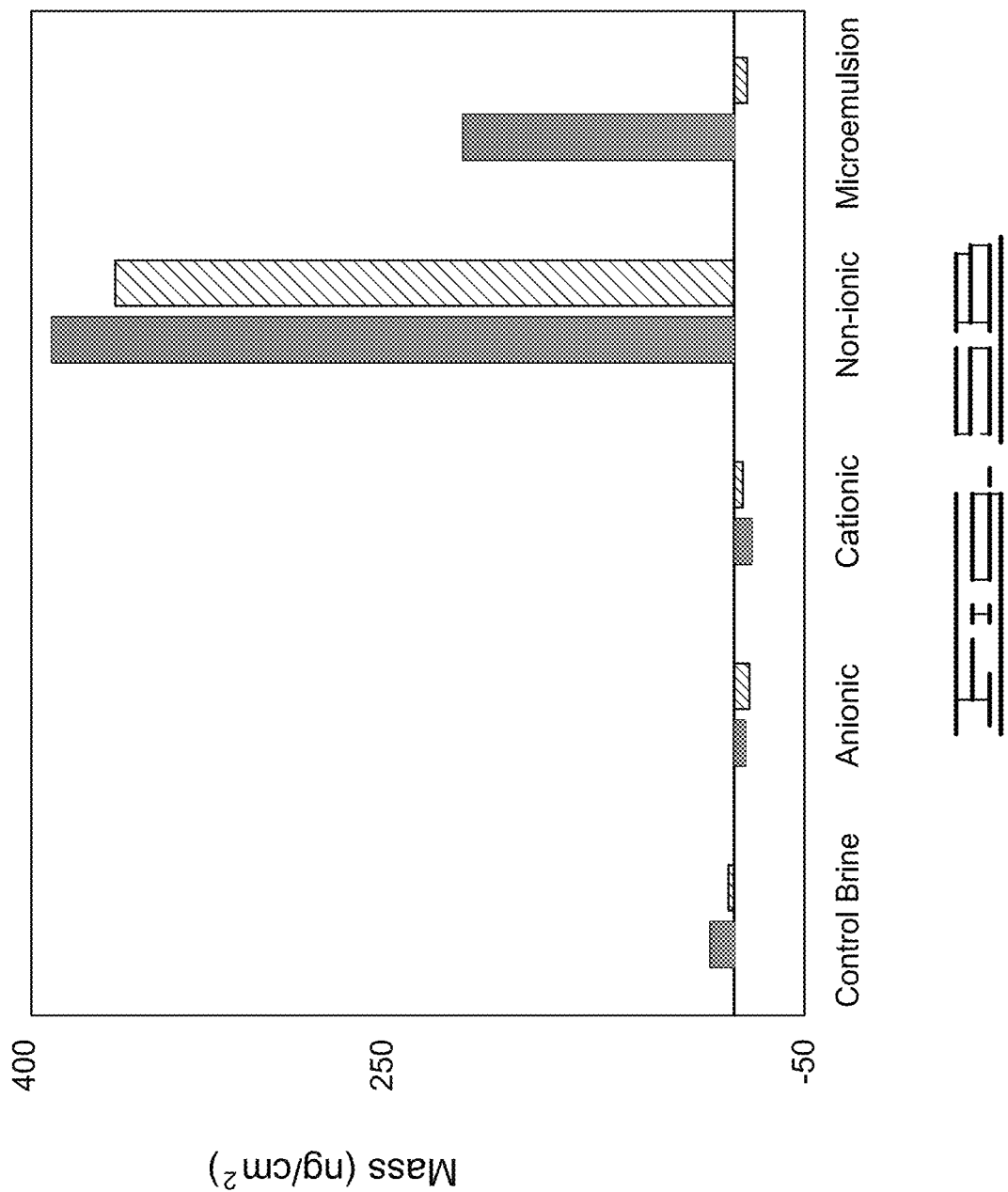

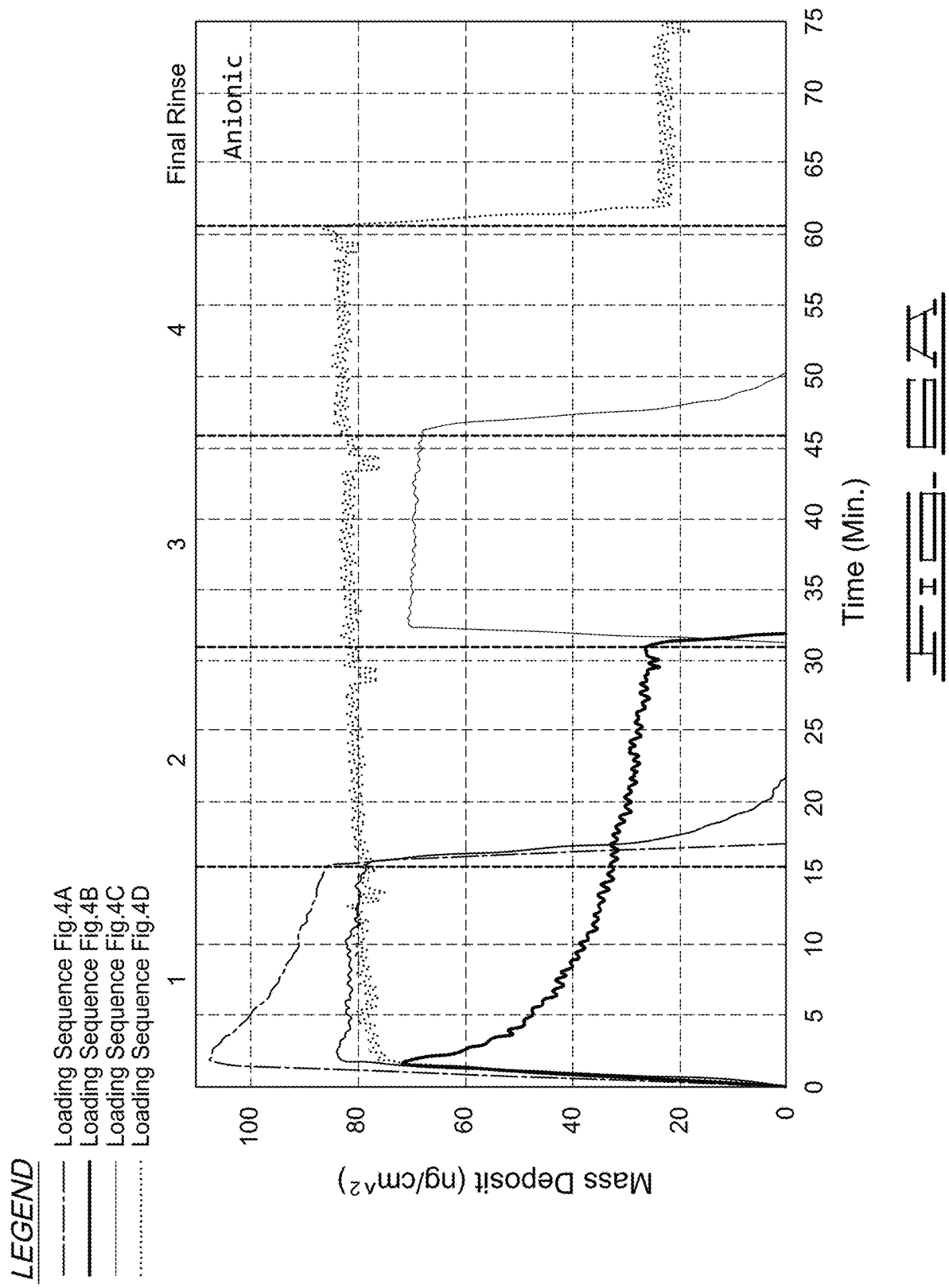

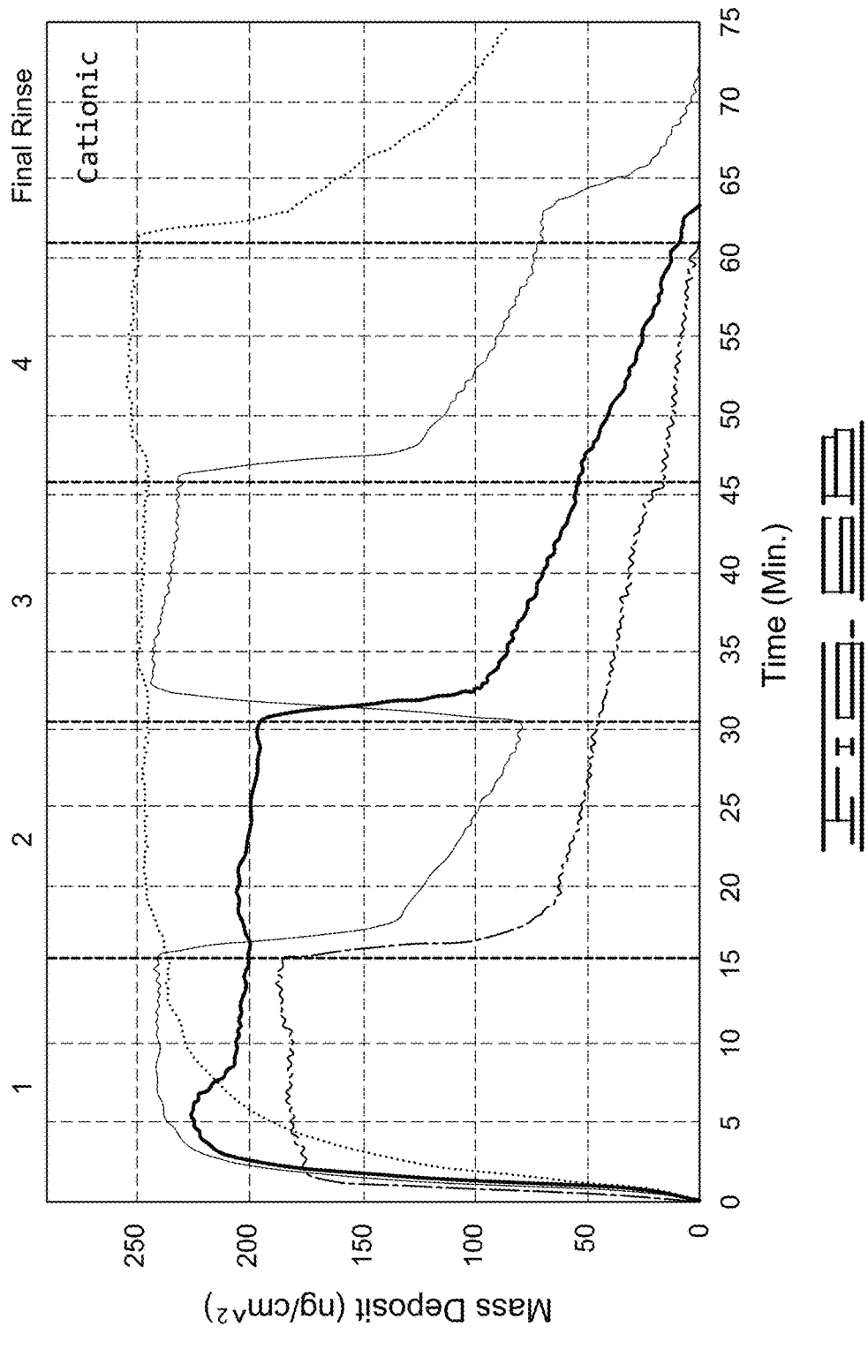

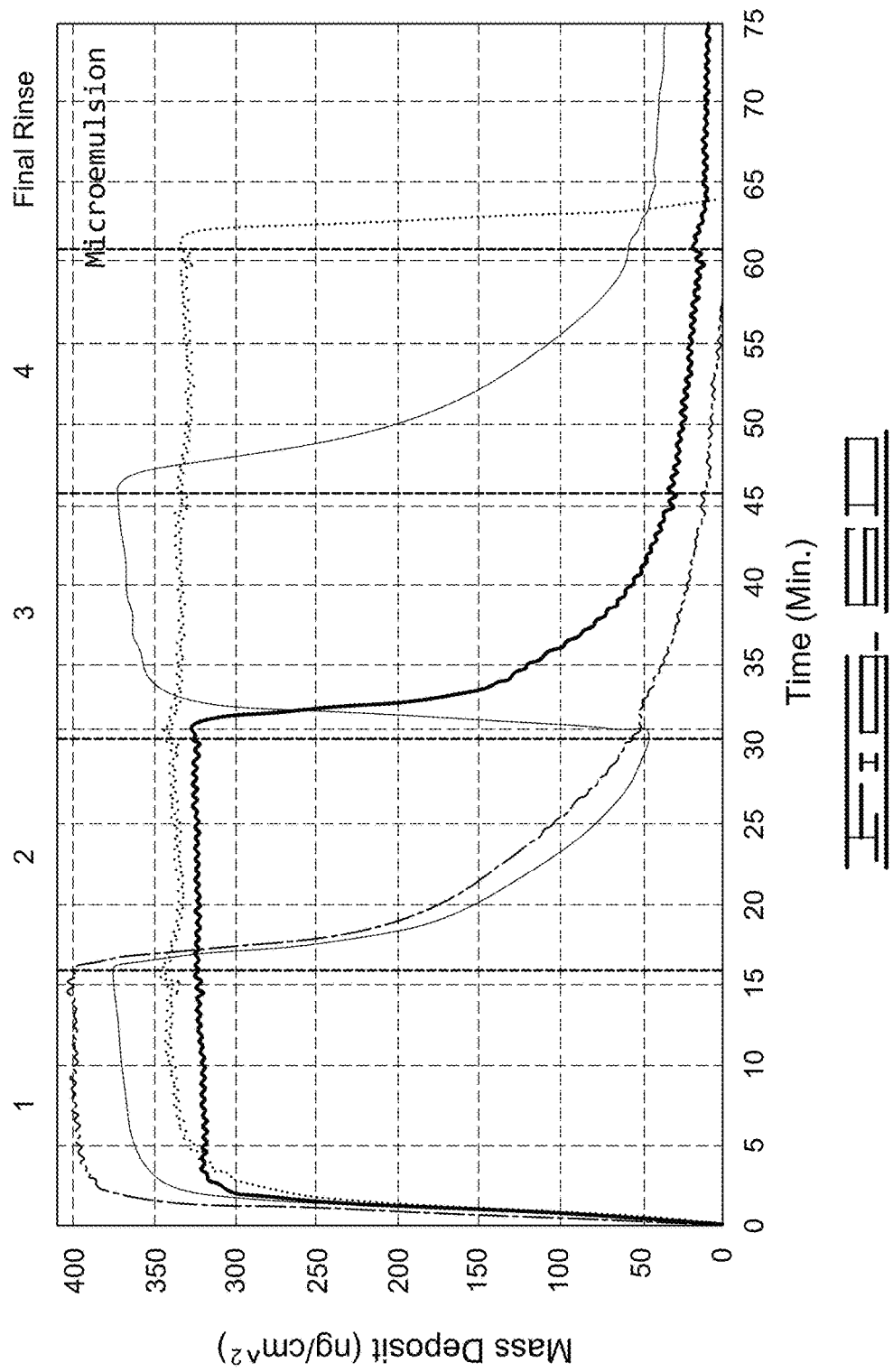

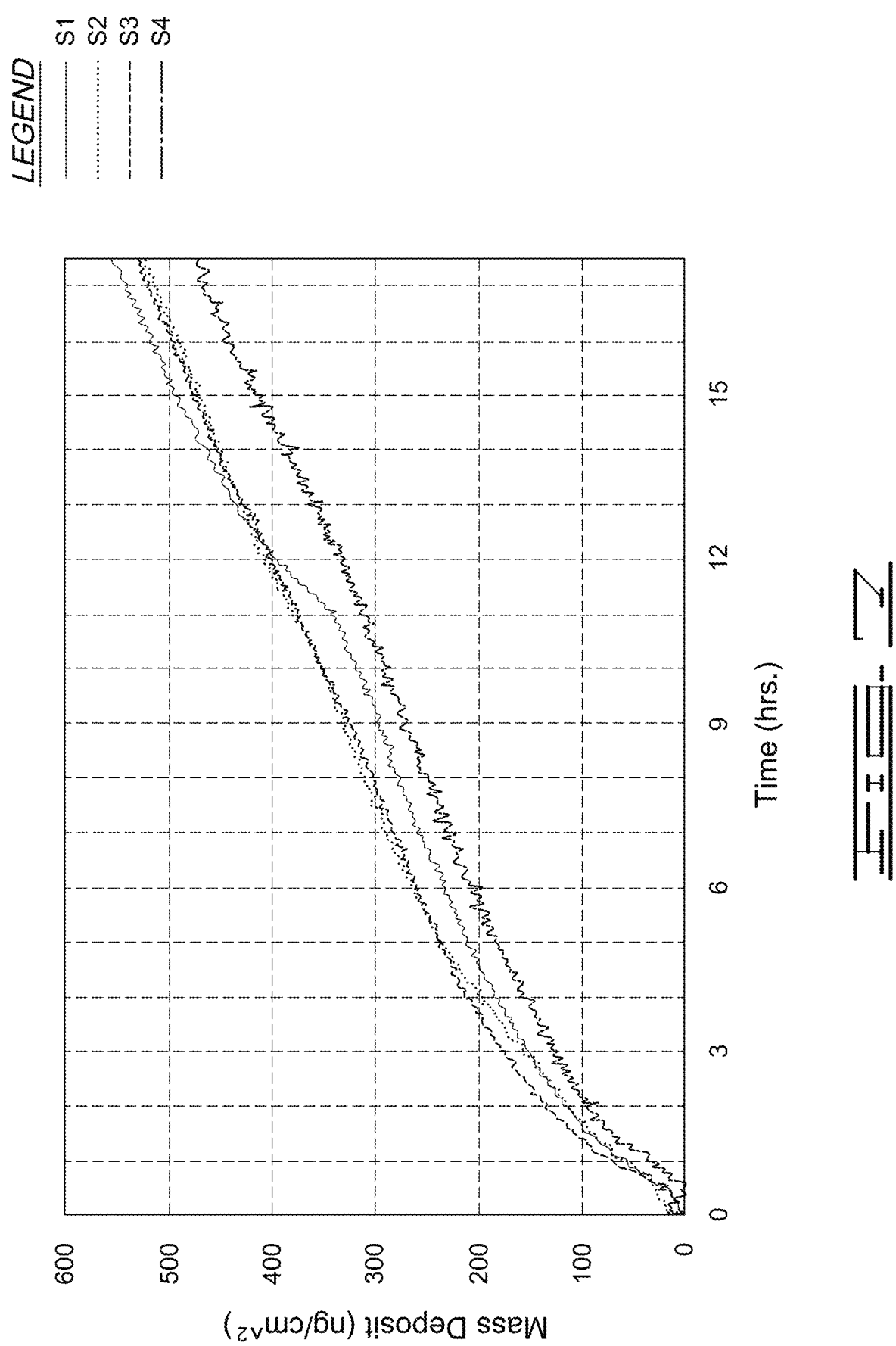

SURFACTANT SELECTION WORKFLOW BASED ON PERFORMANCE AT THE RESERVOIR SURFACE

FIELD

The present disclosure relates generally to downhole operations for subterranean formations, more specifically in certain embodiments, to selecting treatment fluid additives for use in downhole operations.

BACKGROUND

Treatment fluids can be used in a variety of subterranean treatment operations. As used herein, the terms "treat," "treatment," "treating," and grammatical equivalents thereof refer to any subterranean operation that uses a fluid in conjunction with achieving a desired function and/or for a desired purpose. Use of these terms does not imply any particular action by the treatment fluid. Illustrative treatment operations can include, for example, fracturing operations, enhanced oil recovering operations, surfactant flooding operations, near wellbore cleaning operations, gravel packing operations, acidizing operations, scale dissolution and removal, consolidation operations, and the like.

Surface-active components, such as polymers and surfactant, are widely used in treatment fluids for drilling operations and other well-treatment operations, including hydraulic fracturing, refracturing, flooding, secondary recovery, and acidizing (both fracture acidizing and matrix acidizing) treatment operations. Surface-active components may also be used to enhance or improve treatment fluid and hydrocarbon recovery operations.

BRIEF DESCRIPTION OF THE DRAWINGS

The drawings included with this application illustrate certain aspects of the embodiments described herein. However, the drawings should not be viewed as exclusive embodiments. The subject matter disclosed herein is capable of considerable modifications, alterations, combinations, and equivalents in form and function, as will be evident to those skilled in the art with the benefit of this disclosure.

FIGS. 4A, 4B, 4C and 4D illustrate four different loading sequences for the same volume of surfactant.

FIGS. 6A, 6B, 6C and 6D are four graphs showing the measurements by coated QCM-D sensors over time for the four loading sequences illustrated in FIGS. 4A-D. Each graph indicates the loading sequence measurements for four different surfactants.

FIG. 7 is a graph illustrating the oil wetting over time of four coated QCM-D sensors.

DETAILED DESCRIPTION

Figure 1:
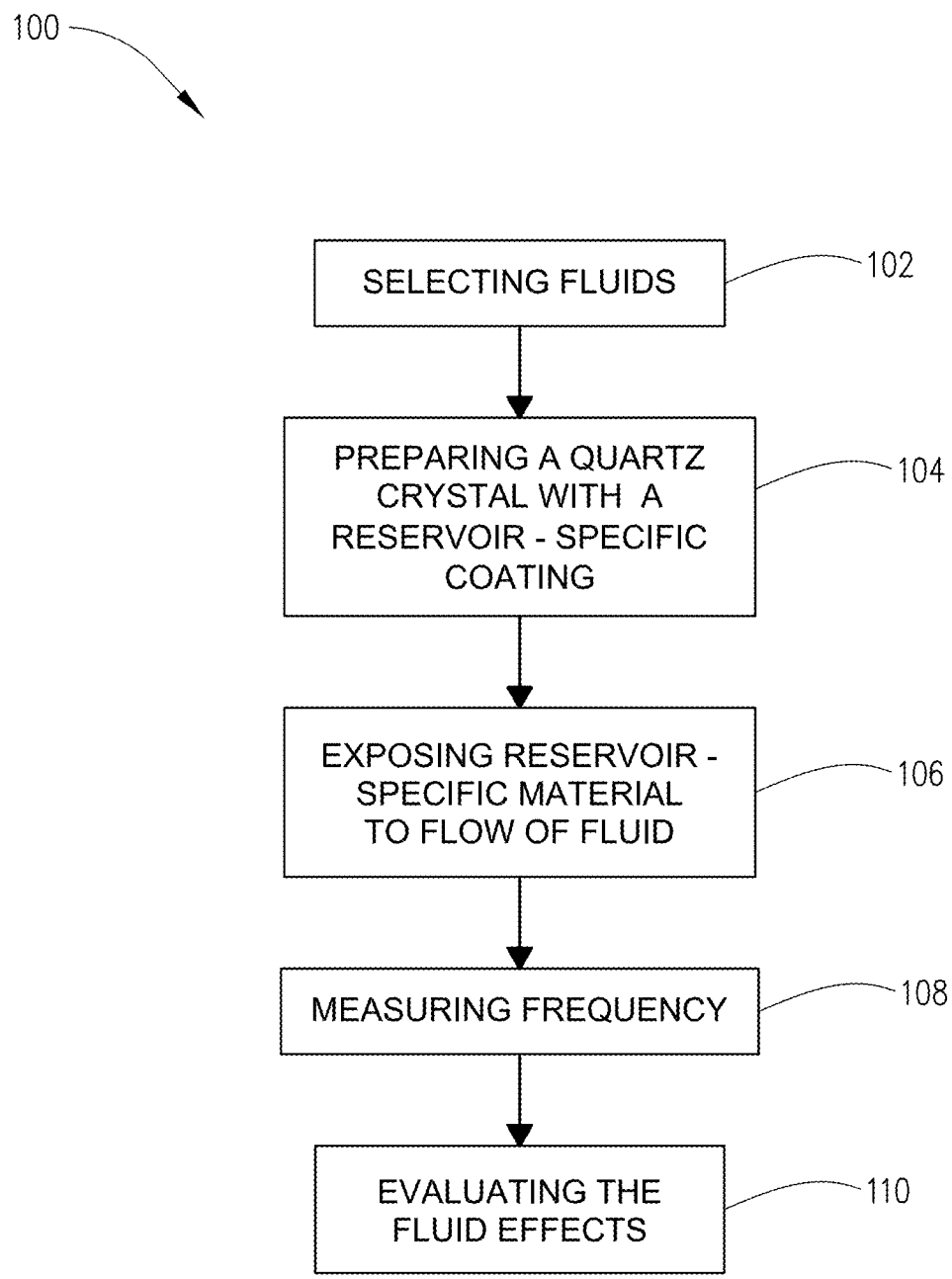
FIG. 1 is a diagram illustrating a workflow that may be used to evaluate well-treatment fluids in accordance with this disclosure.

The present disclosure may be understood more readily by reference to this detailed description. Numerous specific details are set forth in order to provide a thorough understanding of the embodiments described herein. However, it will be understood by those of ordinary skill in the art that the embodiments described herein can be practiced without these specific details. The description is not to be considered as limiting the scope of the embodiments described herein.

As will be described in further detail below, embodiments of the present disclosure are directed to systems and methods of analyzing the interaction of treatment fluids, including surface-active components (such as polymers and surfactant), with minerals in a clean state, an oil-wetted state or water wetted state. Specifically, the systems and methods utilize quartz crystals to determine changes in mass that impact fluid interaction with the minerals. The changes reflect the interaction of the treatment fluid with the minerals and hydrocarbons present in surface materials deposited on the quartz crystal. The surface material is representative of formation material (subsurface rock and/or subsurface minerals) or proppant. The quartz crystal has a surface with the surface material deposited on the surface. Typically, the surface material will be a reservoir-specific material; that is, the surface material composition will be representative of the compositions of a proppant for use in the reservoir, representative of the composition of a reservoir of interest, or be a sample of proppant or of material from the reservoir. As used herein, a first substance being "representative of" a second substance refers to the first substance having chemical composition and structure similar to the second substance such that it interacts with fluids in a similar way. More typically, the mineral composition and structure of the first substance will be similar to or the same as the second substance. In some cases, the first substance can be a sample of the second substance; in other cases, the first substance is not actually acquired from the second substance, but can comprise components similar to the second substance, which are similar or the same in mineralogy and structure to the second substance.

The quartz crystals of this disclosure are configured to be quartz crystal microbalance sensors. A quartz crystal microbalance (QCM) (also known as quartz microbalance (QMB), sometimes also as quartz crystal nanobalance (QCN)) measures a mass variation per unit area by measuring the change in frequency of a quartz crystal resonator. The resonance is disturbed by the addition or removal of a small mass at the surface of the acoustic resonator. Thus, the QCM uses changes in oscillatory vibrations to measure variations in mass per unit area as different compounds are deposited onto the instrument. Frequency measurements are easily made to high precision; hence, QCM-D is, in essence, an ultra-sensitive mass balance with nanogram sensitivity.

Typically, the QCM can be a quartz crystal microbalance with dissipation (QCM-D). QCM-D sensors are QCM based sensors on ring-down technique, a method to interrogate acoustic resonators. Thus, in addition to measuring the frequency, the dissipation factor (equivalent to the resonance bandwidth) is measured to help analysis.

The present techniques expose such a QCM sensor to a fluid at a controlled temperature and directly measures surface associations through the change in mass over time. Additionally, altering the material composition of the sensor surface with a reservoir-specific material and modifying the wettability with hydrocarbon samples gives better representation of the surface interactions present in oil producing reservoirs.

The method of the current disclosure can be better understood with reference to FIG. 1. As illustrated, the workflow 100 begins with selecting one or more fluids for analysis 102. The fluids used are generally surface-active components (such as surfactants) or well-treatment fluids containing surface-active components and/or aqueous-based or oil-based fluids, with or without other additives such as gelling agents, scale inhibitors, clay stabilizers, buffers, breakers and/or friction reduction polymers. However, the methods can be broadly applied to treatment fluids, such as testing additives individual or combined with an aqueous-based or oil-based fluid and/or other additives, which are for use in wells and subterranean reservoirs. Unless indicated otherwise, "well-treatment fluids" as used herein includes surfactants, other surface-active components, other additives and the base treatment fluid (aqueous based and oil based) both separately and in combination with each other.

For example, treatment fluids that may be useful in accordance with the present disclosure may be any treatment fluid known in the art. Treatment fluids that may be useful in accordance with the present disclosure include, but are not limited to, fracturing fluids, slick-water fracturing fluids, gravel packing fluids, pre-pad fluids, pad fluids, preflush fluids, afterflush fluids, acidic fluids, consolidation fluids, cementing fluids, weighted fluids, well bore clean-out fluids, conformance fluids, aqueous fluids (e.g., fresh water, salt water, brines, etc.), non-aqueous fluids (e.g., mineral oils, synthetic oils, esters, etc.), hydrocarbon-based fluids (e.g., kerosene, xylene, toluene, diesel, oils, etc.), foamed fluids (e.g., a liquid that comprises a gas), gels, emulsions, complex fluids, gases, and the like.

The treatment fluids used in accordance with the methods of the present disclosure optionally may comprise any number of additives. Examples of such additional additives include, but are not limited to, salts, surfactants, acids, proppant particulates, diverting agents, fluid loss control additives, tracking chemicals, gas, nitrogen, carbon dioxide, surface modifying agents, tackifying agents, foamers, corrosion inhibitors, scale inhibitors, catalysts, clay control agents, biocides, friction reducers, antifoam agents, bridging agents, flocculants, additional $H_2S$ scavengers, $CO_2$ scavengers, oxygen scavengers, lubricants, additional viscosifiers, breakers, weighting agents, relative permeability modifiers, resins, wetting agents, coating enhancement agents, filter cake removal agents, antifreeze agents (e.g., ethylene glycol), and the like. Such additives may also affect the selection of a surfactant as such additives may have an effect on the characteristics of the treatment fluid.

The present disclosure is particular relevance to selecting a surfactant for treating a subterranean formation. Accordingly, the fluid can be a surfactant or a surfactant containing treatment fluid. Surfactants are an important component in treatment fluids for ensuring higher productivity from unconventional hydrocarbon formations. The efficacy of surfactants chosen for a subterranean treatment or operation depends on a number of factors, including formation characteristics, hydrocarbon compositions, and components of the treatment fluid. Even minor changes in hydrocarbon, formation water, or formation rock composition from reservoir to reservoir can have a major impact on the performance of a surfactant.

Surfactants may affect many variables in subterranean treatments and operations, such as interfacial/surface tension, wettability, compatibility with other additives (such as other additives used in acidizing treatments), and emulsification tendency. The methods of the present disclosure can be used for selecting an optimum surfactant or blend of surfactants for treating a particular subterranean formation based on the performance of the surfactant or blend of surfactants relative to the performance of other surfactants while taking into consideration the characteristics of a particular subterranean formation, including the formation materials and the hydrocarbon, and the characteristics of the treatment fluid that may be used to treat the subterranean formation. The optimum surfactant or blend of surfactants for a particular subterranean formation may vary based on the type of surfactant and the characteristics of the subterranean formation or the treatment fluid that may be used to treat the subterranean formation.

The surfactant used in the methods of this disclosure can be any known in the art, including anionic, cationic and nonionic surfactants and those forming micelle and/or microemulstions, among others.

Returning now to FIG. 1, in step 104, one or more quartz crystals are provided for the method. The quartz crystal(s) has a surface with a reservoir-specific material deposited on the surface. The reservoir-specific material is representative either of the proppant composition of a proppant or of a formation material from the subterranean reservoir. For example, the surface of the quartz crystal can be coated with the reservoir-specific material by pulverizing the proppant or formation material to form a powder material, and then depositing the reservoir-specific material onto the surface by any suitable process. For example, spin coating, spin casting, sputter coating, dip coating, physical vapor deposition (PVD), chemical vapor deposition (CVD), plasma enhanced CVD, atomic lay deposition, evaporation, plating, electroplating or electrophoresis. Alternatively, representative minerals can be grown on the surface. These surface preparation processes result in a reservoir specific coating that is similar to a thin film of rock with minimal pores, roughness, which aids in the evaluation of chemical affinity and bonding.

Additionally, in some application as further explained below, the coated surface can be further modified by exposing the reservoir-specific material, which coats the sensor surface, to hydrocarbons for a period of time. Generally, during such exposure, the surface will be covered with hydrocarbons for periods of more than 1 minute. For example, the period can be from 1 minute to 30 days, and more typically from 1 to 24 hours. As used herein, "aged" refers to reservoir-specific material that has been so treated with hydrocarbon; that is, reservoir-specific material that has hydrocarbons adsorbed on the surface. As used herein, "clean" refers to reservoir-specific material that has not been aged or that is substantially free of hydrocarbons or is free from an induced hydrocarbon layer. Once the sensor has been coated with reservoir-specific materials (with or without hydrocarbon, and with or without aging) the sensor will have a representative reservoir material surface.

Generally, the proppants used will be porous proppants including sand-based proppants, ceramic-based proppants, bauxite, granite, and similar materials as are known in the art.

As used herein, the term "formation material(s)" refers to any solid material that may be found in a subterranean formation including, but not limited to, drilled core samples from rock formations (e.g., calcites, dolomites, limestone, shale), cuttings retrieved while the formation is being drilled, rock samples representative of formation mineralogy, samples of rock harvested from outcrops, unconsolidated sands, quartz, carbonates, clays, limestones, proppant, formation hydrocarbon, formation water, and the like. In certain embodiments, the formation materials used in accordance with the methods of the present disclosure may be acquired from a subterranean formation to be treated with the fluids selected in accordance with the methods of the present disclosure. In certain embodiments, the formation materials used in accordance with the methods of the present disclosure may be representative of materials that may be found in a subterranean formation to be treated with the selected fluids. In those embodiments, the formation materials used in accordance with the methods of the present disclosure may be such that they are not actually acquired from the subterranean formation to be treated, but may comprise components similar to formation materials that may be acquired from the subterranean formation and thus are similar or the same in mineralogy and structure.

Next, the reservoir-specific material on the quartz crystal is exposed to a well-treatment fluid in step 106, either as a flow of well-treatment fluid or under static conditions. During the exposure or after a predetermined time of exposure, the frequency measurements are made for the quartz crystal (step 108), which can be correlated to changes in mass as is known in the art. Thus, a change in mass can be determined, which is representative of the adsorption or desorption of fluids by the reservoir-specific material. Further, these measurements can be made over predetermined time of exposure so that the change in mass over time can be determined. Based on the change in mass, the fluid can be evaluated for use in the subterranean formation (step 110) to thus determine one or more properties of the fluid. As will be realized, the change in mass can be correlated with the adsorption rate and/or desorption rate of fluids from the reservoir-specific material. The adsorption/desorption of fluids can be the adsorption/desorption of well-treatment fluid (such as a surfactant) or can be the adsorption/desorption of hydrocarbons, such as when an aged reservoir-specific material is used. Further, the evaluation can combine the adsorption/desorption information with other data such as wettability alteration and fluorescence imaging.

As will be realized from the above, processes in accordance with this disclosure have wide application for use in evaluating treatment fluids and the interactions with clean formation materials, clean proppants, aged formation materials, and/or aged proppants. In a more specific embodiment illustrated in FIG. 2, coated QCM-D sensors are further used to evaluate surfactant interactions with reservoir-specific material surfaces, while also looking at the effects of pumping schedules on deposition and finally to look at how surface properties impact the capability of a surfactant to displace oil from an oil-wet surface. While this specific embodiment is shown with three component analysis, those skilled in the art will realize based on this disclosure that each component analysis can be carried out as a separate process. Also, while described specifically for surfactants, those skilled in the art will realize based on this disclosure that the component analyses can be adapted to evaluate other treatment fluids.

Figure 2:
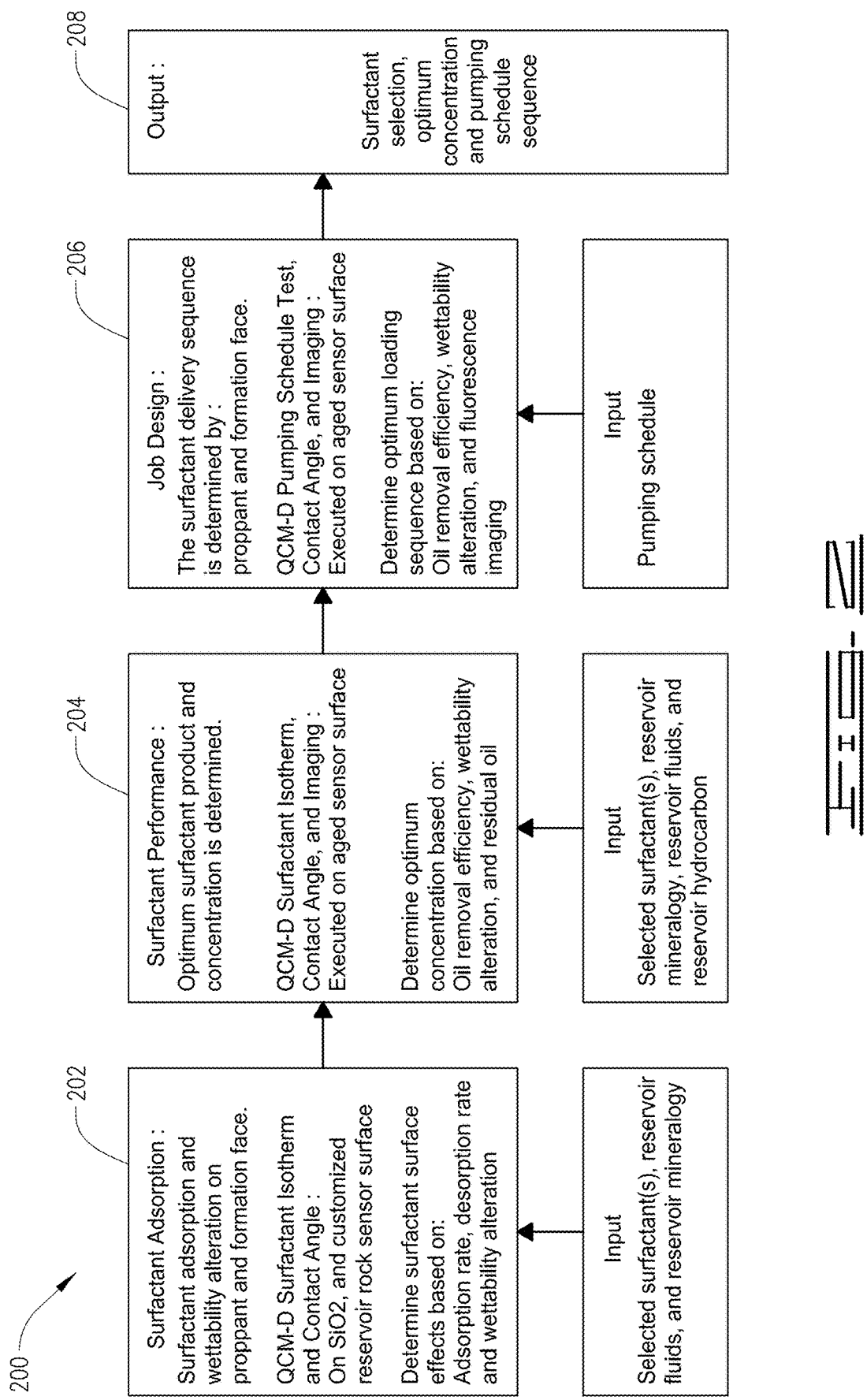
FIG. 2 is a diagram illustrating a process where QCM-D sensors are used to measure the role of the triple-point in a three-component system as a surface is converted from oil-wet to water-wet.

Turning now to FIG. 2, a process 200 is illustrated where quartz crystal sensors are used to measure the role of the triple-point in a three-component system as a surface is converted from oil-wet to water-wet. Process 200 comprises three analyses: surfactant adsorption analysis 202, surfactant performance analysis 204, and job design analysis 206.

In surfactant adsorption analysis 202, a quartz crystal sensor (QCM or QCM-D) is provided. The surface of the crystal has been treated to deposit thereon reservoir-specific material representative either of a proppant composition or of formation material composition. Typically, the material will either be crushed proppant from the proppant that is proposed for use in the subterranean formation or actual formation material from the subterranean formation. The reservoir-specific material is clean reservoir-specific material, thus has not been aged in surfactant adsorption analysis 202. Accordingly, the reservoir-specific material has not adsorbed any hydrocarbons. Additionally, one or more surfactants are selected for the analysis 202.

During analysis 202, the reservoir-specific material on the quartz crystal is exposed to a surfactant, typically as a flow of surfactant but the exposure can be to static surfactant. As described above, during and/or after exposure the frequency of the quartz crystal is measured to thus determine a change in mass representative of the adsorption or desorption of the surfactant by the reservoir-specific material. The surfactant adsorption/desorption analysis will typically include isotherm dynamic loading sequences, wherein progressively increasing concentrations of surfactant are introduced to the reservoir-specific material on the quartz crystal. Accordingly, from these measurements, properties such as the adsorption rates and/or desorption rates of the surfactant can be determined. Between loadings of surfactant and/or between testing of surfactants, the quartz crystal can be exposed to a flow of water to wash the reservoir-specific material and determined if it will effectively go back to a "clean state".

Figure 3A:
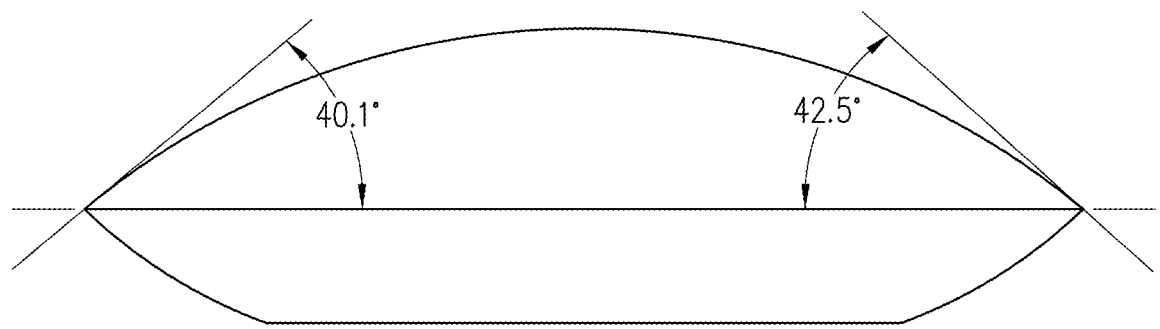
FIGS. 3A and 3B illustrate contact angles for two water wettability conditions.
Figure 3B:
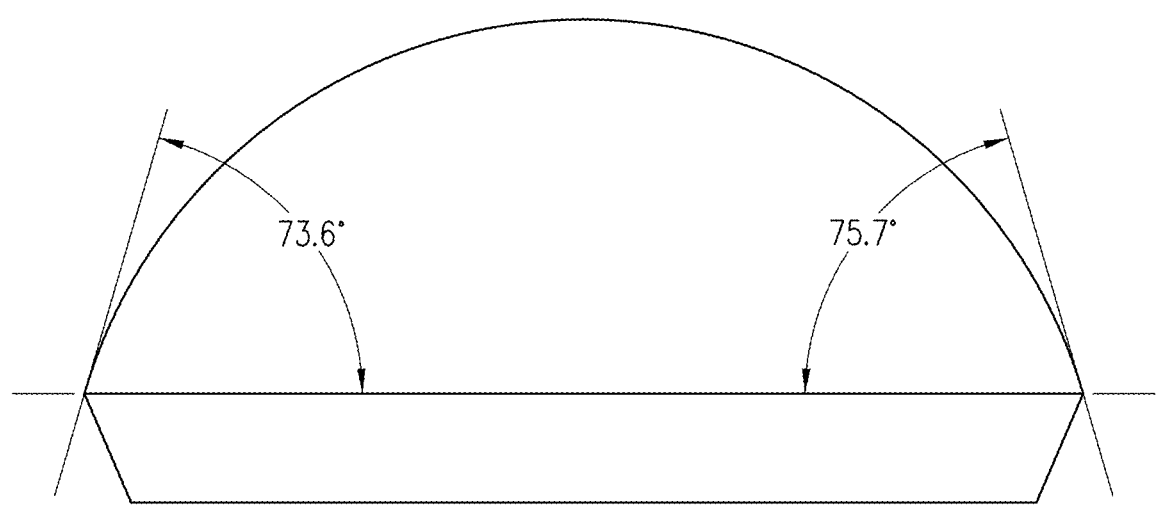

Additionally, the contact angle of the surfactant on the reservoir-specific material can be determined. The contact angle can be determined by image analysis on a drop of water on the surface of the reservoir-specific material and analyzed as is known in the art for determining contact angles. The angle formed by the drop and the reservoir-specific material surface indicates the wettability of the surface. Wettability is reported as a relative value, comparing the contact angle on a surface before and after the introduction of surfactant or oil. Lower contact angle values indicate a more water-wet surface, while larger values occur for surfaces that are less water wet. FIGS. 3A and 3B demonstrate the two examples of wettability conditions.

For surfactant performance analysis 204, the reservoir-specific material on the quartz crystal is exposed to hydrocarbons to produce an aged reservoir-specific material. For the aged surface, the quartz crystal is again exposed to a surfactant, which can include isotherm dynamic loading, and measurements are taken, including fluid adsorption/desorption measurements and measurements of contact angle. Additionally, fluorescent imaging can be used using UV light to evaluate oil coverage on the reservoir-specific material.

Because the reservoir-specific material now has adsorbed hydrocarbons, the adsorption/desorption crystal measurements will reflect the accumulation of surfactant at the surface and the oil removal by the surfactant, which can be evaluated by comparison to the results of surfactant adsorption analysis 202. Accordingly, from these measurements, the surfactant(s) can be evaluated so as to determine the efficiency of hydrocarbon removal from the aged reservoir-specific material by the surfactant, and to determine an optimal surfactant concentration for use in treatment fluids for the subject subterranean formation.

During job design analysis 206, specific loading sequences for the surfactant are analyzed for use in the reservoir in recovering hydrocarbons. For this analysis, the aged reservoir-specific material on the quartz crystal is exposed to the well-treatment fluid for a plurality of loading sequences; typically this will be as a flow of the well-treatment fluid but can be under static conditions. For example, the loading sequences may comprise loading of the same volume of surfactant with different sequences as depicted in the graphs in FIG. 4A-D. Loading 1 is a front loading sequence wherein four times the optimal concentration of surfactant (based on the optimal surfactant usage determined from analysis 202 and analysis 204) is used in the first stage with none for the remaining three stages. Loading 2 is an early loading sequence where double the optimal concentration is used in the first two stages and none in the last two stages. Loading 3 is a staged loading sequence wherein double the optimal concentration is used in the first and third stages with none in the second and fourth stage. Loading 4 is a continuous treatment sequence wherein the optimal concentration is used across all stages.

During each loading sequence, the frequency of the quartz crystal is measured to thus determine a change in mass representative of the adsorption or desorption of fluids by the aged reservoir-specific material. Additionally, contact angles and fluorescence imaging measurements can be obtained for each sequence. Based on the measurements, the surfactant is evaluated so as to determine a preferred loading sequence associated with the subterranean reservoir and surfactant.

Accordingly, the results or output 208 of the surfactant adsorption analysis 202, surfactant performance analysis 204, and job design analysis 206 is the selection of the most effective surfactant, its optimum concentration and an optimum pumping schedule (loading sequence).

The above disclosure is exemplified by a method wherein well-treatment fluids are evaluated for use in a subterranean reservoir, such as in fracturing and other downhole operations. The method focuses on the interaction between well-treatment fluids at interfaces with solids such as the formation material or proppants introduced during downhole operations. Thus, for example, generally the method comprises providing a quartz crystal having a surface with a reservoir-specific material deposited on the surface. The reservoir-specific material is representative of either a composition of a proppant for use in a subterranean reservoir containing hydrocarbons or of a composition of formation material from the subterranean reservoir. The reservoir-specific material on the quartz crystal is exposed to a well-treatment fluid. During and/or after the exposure, the frequency of the quartz crystal is measured to thus determine a change in mass representative of the adsorption or desorption of fluids by the reservoir-specific material. A property of the well-treatment fluid is determined based on the change in mass.

In this method, the reservoir-specific material may be aged by exposure to hydrocarbons or may be clean reservoir-specific material depending on the analysis to be carried out. If the reservoir-specific material is clean reservoir-specific material, then the step of determining a property of the well-treatment fluid based on the change in mass generally includes determining at an adsorption rate or desorption rate for the well-treatment fluid in relation to the reservoir-specific material and/or determining the wettability alteration of the reservoir-specific material by exposure to the well-treatment fluid.

If the reservoir-specific material is aged, then in some embodiments the steps of the method can more specifically be described as exposing the reservoir-specific material on the quartz crystal to the well-treatment fluid; measuring a frequency of the quartz crystal to thus determine a change in mass representative of the adsorption or desorption of fluids by the reservoir-specific material; and evaluating the well-treatment fluid based on the change in mass so as to determine the efficiency of hydrocarbon removal from the reservoir-specific material by the well-treatment fluid.

If the reservoir-specific material is aged, then in other embodiments the steps of the method can more specifically be described as exposing the reservoir-specific material on the quartz crystal to the well-treatment fluid for a plurality of loading sequences; measuring a frequency of the quartz crystal during each loading sequence of the plurality of loading sequences to thus determine a change in mass representative of the adsorption or desorption of fluids by the reservoir-specific material; and evaluating the well-treatment fluid based on the change in mass so as to determine a preferred loading sequence associated with the subterranean reservoir and well-treatment fluid.

In some embodiments, the two aged reservoir-specific material embodiments are combined together, and in other embodiments, one of the aged reservoir-specific material embodiments is combined with the method of using clean reservoir-specific material. Generally, in the latter the reservoir-specific material is aged after being used in the clean state; however, it is within the scope of this disclosure for there to be multiple quartz crystals with reservoir-specific material deposited on the surface so that some of the quartz crystals have aged reservoir-specific material and some clean reservoir-specific material and the methods can be run concurrently or sequentially for the different crystals.

In the various embodiments above, the well-treatment fluid can comprise a surfactant and/or the well-treatment fluid can comprise an aqueous base fluid and one or more gelling agents. The reservoir-specific material can comprise proppant material obtained from crushing the proppant, and optionally can consist essentially of the proppant material. Alternatively, the reservoir-specific material can comprise formation material obtained from crushing formation material from the subterranean reservoir, and optionally consists essentially of such formation material. Alternatively, the reservoir-specific material comprises one or more minerals which are present in the formation material. Alternatively, the reservoir-specific material can comprise proppant material and formation material, or proppant granules and minerals that are present in the formation material. Further, the hydrocarbons can be hydrocarbons obtained from the subterranean reservoir or synthetic hydrocarbons with ranges of carbon distribution similar to or the same as hydrocarbons from the subterranean reservoir.

In one example of a specific embodiment, the method includes providing a quartz crystal having a surface with a reservoir-specific material deposited on the surface. The reservoir-specific material is representative of either a composition of a proppant for use in a subterranean reservoir containing hydrocarbons or of a composition of formation material from the subterranean reservoir. The reservoir-specific material is a clean reservoir-specific material.

The reservoir-specific material on the quartz crystal is exposed to a well-treatment fluid and the frequency of the quartz crystal is measured (during and/or after the exposure) to thus determine a change in mass representative of the adsorption or desorption of fluids by the reservoir-specific material. A property of the well-treatment fluid is determined based on the change in mass, which can optionally include determining at least one of an adsorption rate, desorption rate and wettability alteration.

Subsequently, the reservoir-specific material on the quartz crystal is exposed to hydrocarbons to produce an aged reservoir-specific material. The aged reservoir-specific material on the quartz crystal is exposed to the well-treatment fluid. During and/or after the exposure, the frequency of the quartz crystal is measured to thus determine a change in mass representative of the adsorption or desorption of fluids by the aged reservoir-specific material. Then, the well-treatment fluid is evaluated based on the change in mass so as to determine the efficiency of hydrocarbon removal from the aged reservoir-specific material by the well-treatment fluid.

After the exposure to hydrocarbons to produce the aged reservoir-specific material, the aged reservoir-specific material on the quartz crystal is exposed to the well-treatment fluid for a plurality of loading sequences and the frequency of the quartz crystal during each loading sequence of the plurality of loading sequences to thus determine a change in mass representative of the adsorption or desorption of fluids by the aged reservoir-specific material. Subsequently, the well-treatment fluid is evaluated based on the change in mass so as to determine a preferred loading sequence associated with the subterranean reservoir and well-treatment fluid.

In some embodiments, portions of the above-described specific method can be practiced without carrying out other portions.

The above method, its steps and systems incorporating the method can be better understood by the following examples, which support and illustrate the process.

EXAMPLES

These Examples illustrate the use of quartz crystal microbalance as a method to monitor surfactant interactions with surfaces and at the triple-point on oil-coated quartz crystal sensors.

Four different surfactants having diverse properties were chosen for the examples. Table 1 lists the four surfactants, designated charge, critical micelle concentration (CMC), specific gravity, hydrodynamic diameter, and zeta potential.

TABLE 1

| Surfactant | Classification | CMC (mg/L) | Specific Gravity | Hydrodynamic Diameter (nm) | Zeta Potential (mV) |
| --- | --- | --- | --- | --- | --- |
| A | Anionic | 65 | 1.080 | 245 | −70 |
| B | Cationic | 125 | 0.920 | 475 | 45 |
| C | Nonionic Micelle | 100 | 0.903 | 245 | −5 |
| D | Nonionic Microemulsion | 200 | 0.929 | 490 | −35 |

A crude oil sample from a North American formation was collected from a field and chosen to represent a light crude oil in terms of API, Saturate, Aromatic, Resin, and Asphaltene (SARA) composition, and Total Acid Number (TAN). Properties of this oil are presented in Table 2.

TABLE 2

| Properties | Specific Gravity | AP | Saturate | Aromatic | Resin | Asphaltene | TAN |
| --- | --- | --- | --- | --- | --- | --- | --- |
| Crude 1 | 0.083296 | 38 | 49.6 | 47.6 | 2.8 | 0.2 | 0.17 |

CMC was determined from surface tension measurements at increasing concentrations using the Wilhelmy plate method (platinum, 19.900 mm width, 0.200 mm thickness), with a tensiometer equipped with an automated liquid dispensing system. A 1% (v/v) solution of the microemulsion test solution in deionized water was prepared in a volumetric flask and placed into the system's liquid reservoir. The dispensing system was prepared with the test solution and the automated software controlling the dispensing system was used to dose the test solution into a glass test vessel containing 50 mL of deionized water at 24±2° C. The CMC for each surfactant was determined by analysis using linear regression software to find the intersection between the two linear regions of the surface tension versus concentration.

Surfactant hydrodynamic diameter and zeta potential were determined using a light scattering technique in a disposable folded capillary cell equipped with gold electrodes. Each measurement was collected in triplicate at concentrations well above CMC (>20×CMC) in deionized water at 25° C. and the reported hydrodynamic diameter is the average volume-corrected mean diameter and zeta potential is the average of the most dominate peak. It is important to note that these measurements are taken on the formulations as a whole and there can be contributions to the size and zeta potentials from component in the formulation other than the surfactant micelles. For example, the non-ionic microemulsion was formulated using all non-ionic surfactant components, but comes back as anionic probably due to other additives.

Specific gravity and API were determined using a standard method in accordance with ASTM D 287. SARA composition was determined by a SARA analyzer. An aliquot of the crude sample was prepared for Thin Layer Chromatography with Flame Ionized Detection (TLC/FID) analysis. The method used measures the relative amounts of saturated hydrocarbons, aromatic hydrocarbons, resins, and asphaltenes in heavy oils and is not suitable for oils containing a significant amount of volatile components.

Surface wettability was gauged using a Mobile Surface Analyzer (MSA) which employs the sessile drop method, where a 1-μL water drop is placed on top of the measured surface in air at room conditions. Image analysis was done on the drop formed using the provided software, as the angle formed by the drop and the rock surface (FIGS. 3A and 3B). Wettability is reported as a relative value, comparing the contact angle on a surface before and after the introduction of surfactant or oil. Lower contact angle values indicate a more water-wet surface, while larger values occur for surfaces that are less water wet. FIGS. 3A and 3B demonstrate the two wettability conditions.

A QCM-D equipped with four cells in parallel and an autosampler was used for all surface affinity measurements. QCM-D uses the shift of the natural resonance frequency of a quartz crystal to measure the deposited mass on the surface at nanogram sensitivity. The relationship between deposited mass and crystal frequency is governed by the factors in the Sauerbrey equation:

$$-\Delta f = \frac{n * f_0}{\rho_q t_q} \Delta m = \frac{n \Delta m}{C}$$

where n is the harmonic overtone number, $f_0$ is the fundamental resonance frequency, $\rho_q$ and $t_q$ are the specific density and thickness of the quartz crystal sensor, respectively, and C is the sensitivity constant, which equals 17.7 ng $Hz^{-1}$ $cm^{-2}$ for a 5 MHz AT-cut quartz crystal at room temperature.

The QCM-D sensors used were composed of a quartz disk surrounded by a pair of gold electrodes. Surfaces of the sensors were sputter coated with a ~100 nm thick silica or calcite layer. Silica sensors were cleaned with a series of solvents, then dried with $N_2$, while calcite sensors were cleaned with 18.2 MΩ·cm ultrapure deionized (DI) water, then dried with $N_2$. A set of experiments were run where the sensor was exposed to hydrocarbon and aged at 50° C. for 14 hours, to yield an oil-wet surface. Resonance frequencies were collected for the n=1-13 harmonics; the third and fifth harmonic frequency changes were used to calculate the mass adsorbed per surface area using the Sauerbrey equation. Baselines were established for each run on the mass recorded during a 15 minute DI water flow before the introduction of surface-active materials.

Surfactant adsorption was investigated on the prepared surfaces by using dynamic flowing conditions or static conditions. Dynamic studies were run with a loading phase of 15 or 30 minutes at 150 μL/min (residence time of ~16 seconds for a 40 μL reservoir volume) using three designs: affinity, isotherm, and job design. Dynamic affinity tests have two sequences of a) loading, and b) rinsing with fresh deionized water. Isotherm dynamic loading sequence includes surfactant loading at six concentrations from 0.5× CMC to 4.0 gallon/M gallon (gpt). Finally, a dynamic aging study with four stages was used to evaluate sequential loading of the same volume of surfactant with different sequences depicted in the graphs in FIG. 4A-D: Loading 1) front loading: four times the concentration in the first stage with none for the remaining three stages; Loading 2) early loading: doubling the concentration in the first two stages and none in the last two stages; Loading 3) staged loading: double the concentration in the first and third stages with none in the second and fourth stage; and Loading 4) continuous treatment: pumping the same concentration across all stages. The final step in each study was a rinse with 18.2 MΩ·cm ultrapure water. All methods were evaluated for mass changes during loading and mass removed with a water rinse for the final mass. All static tests were run without flow for 12 hours at a single concentration.

Example 1

Example 1 illustrates the measuring of the deposition of surfactant on a silica surface. Silica was chosen because it has the same chemical and crystalline structure as quartz, which is one of the most abundant minerals in the Earth's crust and dominate in most unconventional reservoirs. The silica is composed of $SiO_2$ in a continuous framework. Oxygen atoms present on the surface typically carry a net negative charge and provide hydrogen-bonding sites, rendering the surface more water-wet.

Surfactant adsorption was investigated using silica coated QCM-D sensors by using dynamic flowing conditions. Surface Dynamic studies were done for the following surfactants: brine (control), surfactant A, surfactant B, surfactant C and surfactant D. Surface Dynamic studies were run with a loading phase of 15 minutes at 150 μL/min (residence time of ~16 seconds for a 40 μL reservoir volume) followed by a water rinse for 15 minutes.

Figure 5C:
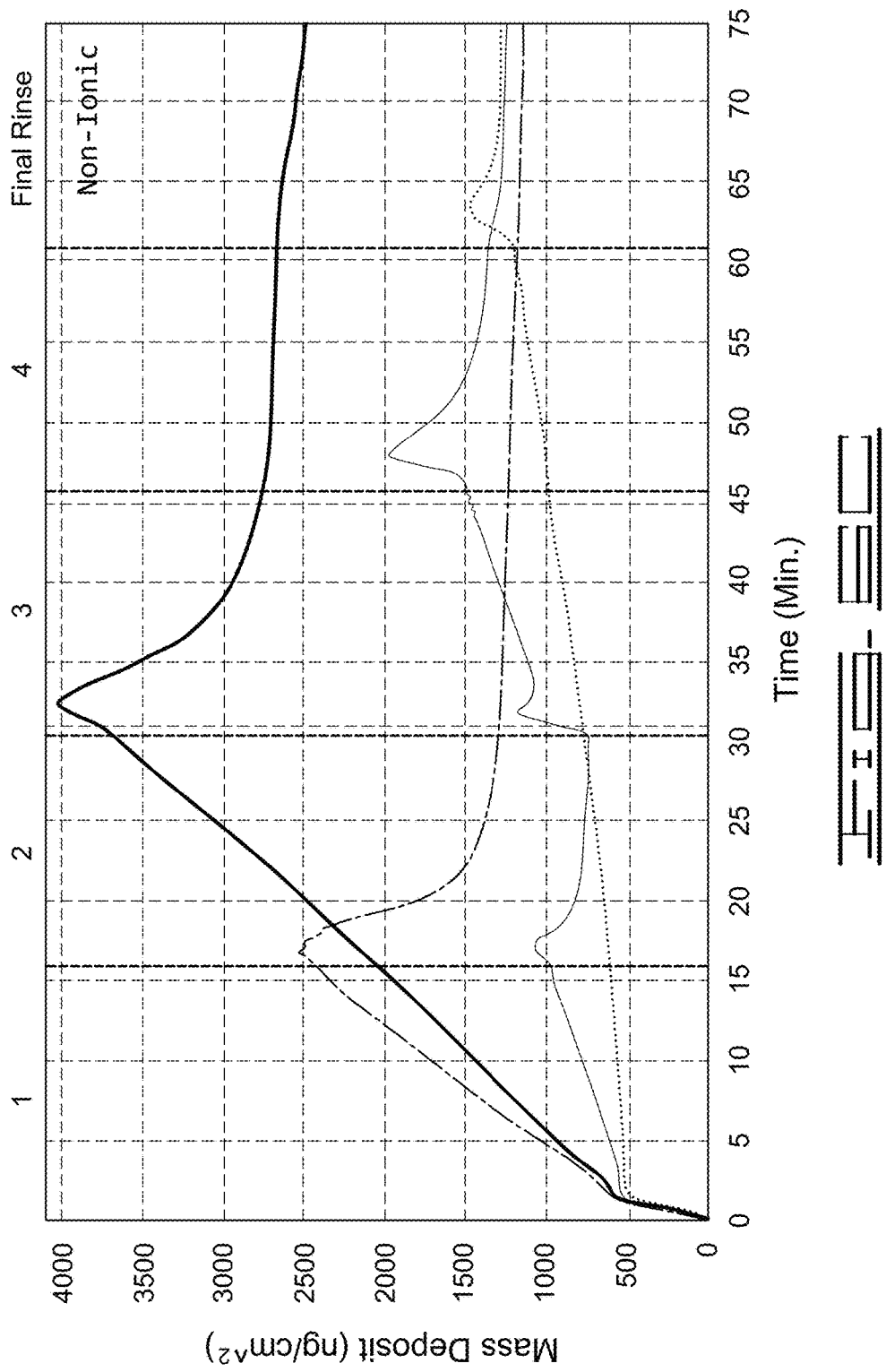
FIGS. 5A and 5B are a pair of graphs illustrating the deposition of four different surfactants onto a reservoir-specific coating material on the surface of QCM-D sensors as measured by the QCM-D sensors.

As seen in FIGS. 5A and 5B, the loaded mass for both charged surfactants (surfactant A and surfactant B) at 1 gpt (gallon per thousand gallons) was negligible (0.0±4.1 and 0.0±3.3 ng/cm$^2$, respectively). Water rinses maintained the mass at the baseline.

Nonionic surfactants showed an affinity and accumulated mass on the silica surface at 1 gpt. Surfactant C, the non-ionic conventional micelle, had an average loaded mass of 485.6±0.8 ng/cm$^2$, while surfactant D, the non-ionic microemulsion, was 191.5±18.1 ng/cm$^2$. The major difference between these two classes of surfactants was that surfactant C retained 90.7% of the deposited mass after each rinse while the surfactant D rinsed off the surface completely (−4% average residual mass). These four classes of surfactants had three different interactions with the silica surface at 1 gpt.

Accordingly, FIGS. 5A and 5B illustrate the ability of coated QCM-D sensors to measure the deposition of surfactant in reservoir-specific coating material.

Example 2

Example 2 illustrated the use of coated QCM-D sensors in determining loading sequences. As can be seen from Example 1, all four classes of surfactants had varying affinity for the surface, which can be due to a verity of factors; these factors could impact the adsorbed mass based on fluid pumping schedule. It is not uncommon in stimulation and EOR treatments to stage a well with different concentrations of surfactant in the pad, pre-pad, spacers, or intervals during treatment. To compare the effects of surfactant loading strategy, a dynamic surface adsorption test with four loading configurations was performed. These stages are shown in materials and methods (FIGS. 4A-D) and briefly described as 1) front loading (similar to a pad), 2) early loading (similar pad and proppant free), 3) staged loading (similar to treating in spacer fluids), and 4) continuous treatment (pumping a constant concentration across all stages). The final step in each study was a rinse with water to determine the final mass retained.

The results of this Example 2 are shown in FIGS. 6A-D in which: FIG. 6A is the QCM-D-generated mass over time chart for Surfactant A, the anionic surfactant; FIG. 6B is the QCM-D-generated mass over time chart for Surfactant B, the cationic surfactant; FIG. 6C is the QCM-D-generated mass over time chart for Surfactant C, the nonionic micelle surfactant; and FIG. 6D is the QCM-D-generated mass over time chart for Surfactant D, the nonionic microemulsion surfactant As shown by FIGS. 6A-D, the impact of the pumping schedule was drastically different for the four surfactant-formulation classes on both the average mass adsorbed and the final retained mass on the silica surface. Accordingly, coated QCM-D sensors can be successfully used to help determine successful loading sequences.

Example 3

Surfactant affinity for the mineral surface is relevant for the wettability alteration of the clean mineral surface; however, most of the subterranean formations are oil-wet. This oil-wet behavior is driven by the presence of adsorbed oil molecules on the formation material surface. Example 3 illustrates the usefulness in coated QCM-D sensors in evaluating the surfactant affinity for an oil-wet surface.

To prepare the coating on the QCM-D, an additional surface preparation was added. Following the sensor cleaning process, the North American crude oil sample was pumped into each cell of the QCM-D to allow for oil molecules to be adsorbed on the surface. Oil in contact with a surface without an aging step has been found to be easily displaced by water, suggesting the surface is still mostly water-wet. To overcome this effect the sensors were aged in contact with the crude oil for 17.5 hours at 50° C. The mass was recorded throughout the aging process and the deposited mass for each sensor was 555.2, 533.4, 530.1, and 478.7 ng/cm$^2$ for an average of 524.4 ng/cm$^2$ and relative standard deviation of 6.2%, almost 2.5 times more mass accumulation than calculated from the Farooq work. The sessile drop contact angles performed on the sensor before and after the aging process and revealed that a significant wettability alteration occurred during the aging process, with the average being 74.7°. The contact angle value increased by 33.4° and there is a near-uniform fluorescent layer in the image taken under UV light, indicating that the surface was rendered oil-wet during the aging process. This result is highly significant as it reveals that during the soak period, oil molecules adsorbed and rendered the surface oil-wet, as illustrated by FIG. 7.

Each of the four classes of surfactants had a different effect on the oil-wet surface. Surfactant A, the anionic surfactant, had very little mass absorbance at any concentration and any residence time and with the oil, it did not add mass to the surface but continually removed oil. Surfactant B, the cationic surfactant, only removed oil at the surfactant front, but then gained mass continuously throughout the experiment for a final gain of 579.3±4.4 ng/cm2, approximately 2-times the mass gained on the silica sensor for any of the non-oil coated surfaces. Furthermore, the resulting sensor had reduced fluorescence, showing that some of the oil was removed, but the high contact angle revealed the surface to be oil-wet. This mass gain and oil-wet surface could possibly be due to a double layer with exposed hydrophobic residues lining the surface. In contrast, Surfactant D, the nonionic microemulsion surfactant, also gained mass (172.4±1.9 ng/cm2) throughout the surfactant exposure, but the oil bound to the surface was still almost completely intact and contact angle measurements showed the surface was rendered more water-wet, suggesting that surfactant bound to the oil without being removed. Surfactant C, the nonionic micelle surfactant, increased the most in total mass; however, there were large mass losses at two distinct points at 2 gpt and 4 gpt, and the resulting sensor had very little fluorescence and was very water wet. This surfactant was the most effective at altering the wettability. The most significant mass loss and reduction to the surface coverage in the fluorescence image was with the anionic surfactant treatment. In this oil-wet experiment, this surfactant showed no mass gain, yet continually removed oil from the surface without deposition and the resulting sensor was slightly oil-wet.

These results indicate that aged coated QCM-D sensors can be successfully used in determining the effects of surfactants on oil-wetted surfaces.

Among many potential advantages, only some of which are alluded to herein, the methods of the present disclosure described above and illustrated in the examples may allow for enhanced hydrocarbon and treatment fluid recovery from a subterranean formation by enabling the selection of treatment fluid compositions (including but not limited to surfactant selection) based on the performance of the treatment fluid with formation materials and hydrocarbon from the particular subterranean formation to be treated and treatment fluids that may be used to treat that formation. The methods of the present disclosure may also allow for quick, low-cost, and accurate surfactant selection for a particular subterranean formation by using minimal equipment to evaluate the performance of the surfactants based on certain criteria including, but not limited to, percent separation of a mixture comprising treatment fluid and hydrocarbon, surface saturation, the role of surface affinity in oil recovery, the surface area coating by a giving fluid concentration, and the compatibility of the surfactants with treatment fluids that may be used to treat a subterranean formation. Because minimal equipment is required to perform the methods of the present disclosure, the methods of the present disclosure may be performed at any location, including, but not limited to, research labs, field labs and production well sites. Moreover, the methods of the present disclosure may allow for a large number of potential surfactants to be quickly evaluated to determine one or more surfactants suited for a particular subterranean formation or application.

Certain embodiments of the methods disclosed herein may directly or indirectly affect one or more components or pieces of equipment associated with the preparation, delivery, recapture, recycling, reuse, and/or disposal of the disclosed well-treatment fluids comprising one or more surfactants selected in accordance with the methods of the present disclosure. For example, the disclosed methods may be used to formulate treatment fluids that may directly or indirectly affect one or more components or pieces of equipment associated with an exemplary fracturing system. In certain instances, such fracturing systems include a fracturing fluid producing apparatus, a fluid source, a proppant source, and a pump and blender system, and resides at the surface at a well site where a well is located that penetrates a portion of a subterranean formation bearing fluids to be produced. In certain instances, the fracturing-fluid producing apparatus combines a gel pre-cursor with fluid (e.g., liquid or substantially liquid) from fluid source, to produce a hydrated fracturing fluid that is used to fracture the formation. The hydrated fracturing fluid can be a fluid for ready use in a fracture stimulation treatment of the well or a concentrate to which additional fluid is added prior to use in a fracture stimulation of the well. In other instances, the fracturing fluid producing apparatus can be omitted and the fracturing fluid sourced directly from the fluid source. In certain instances, the fracturing fluid may comprise water, a hydrocarbon fluid, a polymer gel, foam, air, wet gases and/or other fluids.

In certain embodiments of the present disclosure, a pump and blender system receives a hydrated fracturing fluid and combines it with other components, including proppant and/or additional additives (e.g., one or more surfactants selected in accordance with the methods of the present disclosure). The resulting mixture may be pumped down the well under a pressure sufficient to create or enhance one or more fractures in a subterranean zone, for example, to stimulate production of fluids from the zone. Notably, in certain instances, the fracturing fluid producing apparatus, fluid source, proppant source, and/or additive source may be equipped with one or more metering devices to control the flow of fluids, proppants, and/or other additives to the pumping and blender system and/or to control the concentrations of additives and proppants in the resulting fracturing fluid pumped downhole.

While not specifically illustrated herein, the formulated treatment fluids resulting from the disclosed methods may also directly or indirectly affect any transport or delivery equipment used to convey the compositions to the fracturing system such as, for example, any transport vessels, conduits, pipelines, trucks, tubulars, and/or pipes used to fluidically move the compositions from one location to another, any pumps, compressors, or motors used to drive the compositions into motion, any valves or related joints used to regulate the pressure or flow rate of the compositions, and any sensors (i.e., pressure and temperature), gauges, and/or combinations thereof, and the like.

Therefore, the present compositions and methods are well adapted to attain the ends and advantages mentioned, as well as those that are inherent therein. The particular examples disclosed above are illustrative only, as the present treatment additives and methods may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative examples disclosed above may be altered or modified, and all such variations are considered within the scope and spirit of the present treatment additives and methods.

As utilized in accordance with the present disclosure, the following terms, unless otherwise indicated, shall be understood to have the following meanings: the use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." As used in this specification and claims, the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements, or method steps.

While compositions and methods are described in terms of "comprising," "containing," "having," or "including" various components or steps, the compositions and methods can also, in some examples, "consist essentially of" or "consist of" the various components and steps. That is, the description of open-ended embodiments include closed-ended embodiments, which do not include additional, unrecited elements or method steps.

Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee.

What is claimed is:

1. A method comprising:
   providing a quartz crystal having a surface with a reservoir-specific material deposited on the surface, wherein the reservoir-specific material is either (a) representative of a composition of a proppant for use in a subterranean reservoir containing hydrocarbons such that the reservoir-specific material interacts with fluids in the same way as the proppant or (b) representative of a composition of formation material from the subterranean reservoir such that the reservoir-specific material interacts with fluids in the same way as the formation material from the subterranean reservoir;
   exposing the reservoir-specific material on the quartz crystal to a well-treatment fluid comprising a surfactant, wherein the step of exposing the reservoir-specific material to the well-treatment fluid comprises using a plurality of loading sequences for the well-treatment fluid, in which each loading sequence uses a same volume of the surfactant over a period of time, and wherein each period of time is divided into a plurality of stages, and each stage has a concentration of surfactant in the well-treatment fluid but with the concentration differing among the plurality of stages and the plurality of loading sequences such that there are different sequences of concentrations during the period of time for each loading sequence;
   measuring frequency of the quartz crystal to thus determine a first change in mass representative of the adsorption rate or desorption rate of fluids by the reservoir-specific material, which reflect surface interactions of the well-treatment fluid;
   determining a first wettability alteration for the reservoir-specific material representative of change in wettability due to the step of exposing the reservoir-specific material to the well-treatment fluid;
   exposing the reservoir-specific material on the quartz crystal to hydrocarbons to produce an aged reservoir-specific material;
   exposing the aged reservoir-specific material on the quartz crystal to the well-treatment fluid, the step of exposing the aged reservoir-specific material to the well-treatment fluid comprises using the plurality of loading sequences for the well-treatment fluid;
   measuring frequency of the quartz crystal to thus determine a second change in mass representative of the absorption rate or desorption rate of fluids by the aged reservoir-specific material, which reflect surface interactions of the well-treatment fluid;
   determining a second wettability alteration for the aged reservoir-specific material representative of change in wettability due to the step of exposing the aged reservoir-specific material to the well-treatment fluid; and
   determining performance of the surfactant when used in the subterranean reservoir based on the first change in mass, the second change in mass, the first wettability alteration and the second wettability alteration.

2. The method of claim 1, wherein the well-treatment fluid comprises one or more surfactants.

3. The method of claim 1, wherein the well-treatment fluid further comprises an aqueous base fluid and one or more gelling agents.

4. The method of claim 1, wherein the reservoir-specific material comprises proppant material obtained from crushing the proppant.

5. The method of claim 1, wherein the reservoir-specific material comprises crushed formation material obtained from crushing formation material from the subterranean reservoir.

6. The method of claim 1, wherein the reservoir-specific material comprises one or more minerals which are present in the formation material.

7. The method of claim 1, wherein the step of determining the performance of the well-treatment fluid comprises determining an optimal surfactant concentration for the well-treatment fluid further comprising exposing the reservoir-specific material on the quartz crystal to hydrocarbons prior to exposing the reservoir-specific material to the well-treatment fluid.

8. The method of claim 7, further comprising determining efficiency of hydrocarbon removal from the reservoir-specific material by the well-treatment fluid.

9. The method of claim 1, wherein the hydrocarbons are from the subterranean reservoir.

10. The method of claim 1, wherein
    the step of determining performance of the surfactant comprises determining a pumping schedule for the use of the well-treatment fluid in the subterranean reservoir.

11. The method of claim 1, wherein in the reservoir-specific material is a clean reservoir-specific material prior to the step of measuring the frequency of the quartz crystal to thus determine a first change in mass.

12. A method comprising:

providing a quartz crystal having a surface with a reservoir-specific material deposited on the surface, wherein the reservoir-specific material is either (a) representative of a composition of a proppant for use in a subterranean reservoir containing hydrocarbons such that the reservoir-specific material interacts with fluids in the same way as the proppant or (b) representative of a composition of formation material from the subterranean reservoir such that the reservoir-specific material interacts with fluids in the same way as the formation material from the subterranean reservoir;

exposing the reservoir-specific material on the quartz crystal to a well-treatment fluid for a plurality of loading sequences, wherein the well-treatment fluid comprises a surfactant, wherein each loading sequence is over a period of time, wherein each loading sequence of the plurality of loading sequences uses a same volume of the surfactant over the period of time, and wherein each period of time is divided into a plurality of stages, and each stage has a corresponding concentration of surfactant in the well-treatment fluid but with the concentration differing among the plurality of stages and the plurality of loading sequences such that there are different sequences of concentrations during the period of time for each loading sequence;

measuring frequency of the quartz crystal during each loading sequence to thus determine a first set of changes in mass representative of the adsorption or desorption of fluids by the reservoir-specific material for each loading sequence, wherein the changes in mass reflect surface interactions of the treatment fluid; and determining performance of the well-treatment fluid when used in the subterranean reservoir based on the first set of changes in mass.

13. The method of claim 12, further comprising:

exposing the reservoir-specific material on the quartz crystal to hydrocarbons to produce an aged reservoir-specific material;

exposing the aged reservoir-specific material on the quartz crystal to the well-treatment fluid for the plurality of loading sequences, wherein each loading sequence is over the period of time;

measuring a frequency of the quartz crystal during each loading sequence of the plurality of loading sequences to thus determine a second set of changes in mass representative of the adsorption or desorption of fluids by the aged reservoir-specific material for each loading sequence, wherein the changes in mass reflect surface interactions of the well-treatment fluid; and wherein the step of determining performance of the well-treatment fluid comprises determining a pumping schedule for the use of the well-treatment fluid in the subterranean reservoir.

14. The method of claim 13, wherein the well-treatment fluid further comprises an aqueous base fluid and one or more gelling agents.

15. The method of claim 14, wherein the reservoir-specific material comprises proppant material obtained from crushing the proppant.

16. The method of claim 14, wherein the reservoir-specific material comprises crushed formation material obtained from crushing formation material from the subterranean reservoir.

17. The method of claim 16, wherein the hydrocarbons are from the subterranean reservoir.

18. The method of claim 13, further comprising determining efficiency of hydrocarbon removal from the reservoir-specific material by the well-treatment fluid.

19. The method of claim 13, wherein in the reservoir-specific material is a clean reservoir-specific material prior to the step of measuring the frequency of the quartz crystal during each loading sequence to thus determine a first set of changes in mass representative of the adsorption or desorption of fluids by the reservoir-specific material for each loading sequence.

20. The method of claim 12, wherein the reservoir-specific material comprises one or more minerals which are present in the formation material.

* * * * *